Sept. 12, 1961  J. W. McALLISTER ET AL  2,999,321
APPARATUS FOR FACILITATING THE MAKING OF PLEATED DRAPERIES
Filed May 13, 1959  2 Sheets-Sheet 1
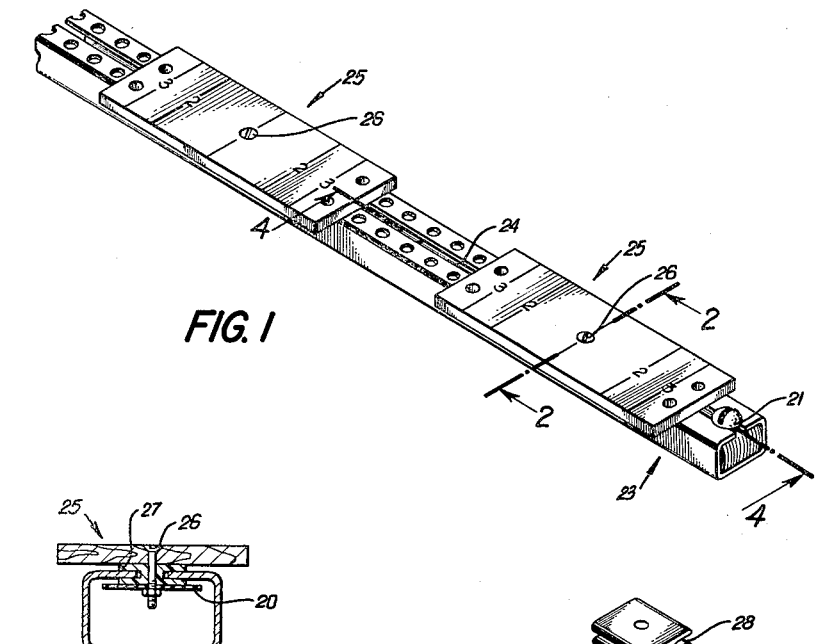
FIG. 1
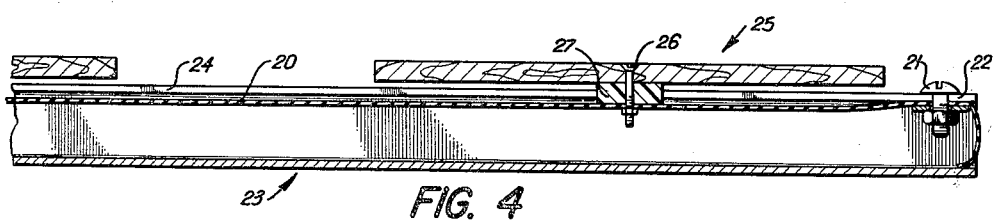
FIG. 2  FIG. 3
FIG. 4
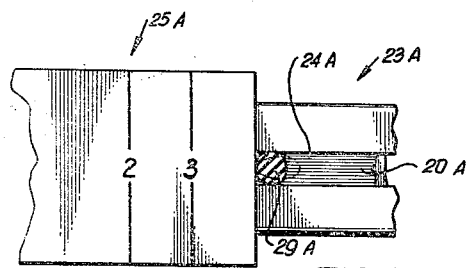
FIG. 7
FIG. 5  FIG. 6
INVENTORS.
JOHN W. McALLISTER
EVA C. McALLISTER INVENTORS.
JOHN W. Mc. ALLISTER
EVA C. Mc. ALLISTER

United States Patent Office 2,999,321
Patented Sept. 12, 1961

2,999,321
APPARATUS FOR FACILITATING THE MAKING OF PLEATED DRAPERIES
John W. McAllister and Eva C. McAllister, West Covina, Calif., assignors of one-tenth to Gadget-Of-The-Month Club, Inc., North Hollywood, Calif., a corporation of California
Filed May 13, 1959, Ser. No. 812,888
10 Claims. (Cl. 33—180)

The present invention consists of aparatus which may be used to greatly speed up the conventionally relatively slow and difficult process of making pleated draperies out of a number of widths of material which have to be fastended together in edge-to-edge relationship to provide an overall panel of material suitable for sue in making such pleated draperies intended to cover a predetermined window or wall space. The prior art method of making pleated draperies to cover a predetermined window or wall area comprises a relatively difficult and time-consuming operation, which frequently results in one of the vertical seams (where adjacent widths of material have been sewn together) falling in an area of the completed drapery where it is visibly obvious, which is highly undesirable Therefore, the apparatus of the present invention was developed to not only greatly facilitate and speed up the operation of making draperies, by eliminating all of the bothersome preliminary mathematical calculations required in conventional prior art drapery-making operations, but to also provide an arrangement very convenient to use for the purpose of effectively "burying" any vertical seams where adjacent widths of material have been sewn together. Indeed, this is one of the most important features of the present invention, and makes it possible to rapidly and easily, and with relatively unskilled help, produce custom-made draperies of virtually any size, and to virtually any pleating specifications, and with all seams effectively hidden from view, usually by means of the pleats.

It is an object of the present invention to provide apparatus for facilitating the making of pleated draperies, which includes an elastic longitudinal member carrying at equally spaced locations therealong a plurality of spacer members, each bearing what amounts to measuring scale means thereon adapted for use in effectively marking a piece of fabric of a panel made of a number of widths of material sewn together so as to denote appropriate specified widths between proposed pleats. This may be accomplished by using tailors' marking chalk, upholsterers' pins, or any other suitable marking means for marking in a symmetrically evenly longitudinally spaced manner the widths between adjacent proposed pleats. It will be understood that by merely stretching out the elastic longitudinal member, which will cause a greater but still even spacing of the plurality of spacer members, virtually any desired length of fabric panel may be caused to have desired pleat spacing and/or pleat sizes, and in a manner which requires no preliminary mathematical calculations. This is one of the most essential and important features of the present invention.

It is a further object of the present invention to provide apparatus for facilitating the making of pleated draperies of the type set forth in the preceding object, including fastening means for fastening a first portion of the elastic longitudinal member at a fixed location, and controllably operable fastening means for fastening any or all of said spacer members in any selected extended relationship with respect to said fixed location, whereby to provide any desired number of pleats and any desired length of inter-pleat spacing, and to do so in a symmetrical manner without requiring any preliminary mathematical calculations.

It is a further object to provide apparatus of the character set forth in the preceding object, wherein any selected ones of said plurality of spacer members may be shifted slightly from the normal symmetrical evenly spaced positions with respect to the entire group of spacer members which would normally be assumed as a result of being equally spacedly carried by the elastic longitudinal member. This slight shifting of selected ones of the spacer members and the locking of them in the shifted positions by means of the controllably operable fastening means, makes it possible to effectively "bury" a vertical seam where adjacent widths of fabric material are sewn together, since such slight shifting or plurality of such shiftings can be so arranged as to cause the seam to fall in a pleat region of the fabric material where it will be effectively hidden from view when the drapery is made and the pleat formed therein.

It is a further object to provide apparatus of the character set forth in the preceding object, including a longitudinal track member of channel-like cross-sectional configuration provided with a longitudinal top central slot extending along the length thereof, and with said track member carrying said longitudinal elastic member therein along the length thereof and slidably carrying the central connection portions of each of said spacer members in said longitudinal slot means, with each of said spacer members being positioned above the longitudinal track member, and with said fastening means for fastening a first portion of the elastic longitudinal member being fastened to the track member adjacent one end thereof, and with the controllably operable fastening means for locking any of said spacer members in any selected relationship, cooperating with said track member along the length thereof.

It is a further object to provide apparatus of the character set forth in any of the preceding objects, wherein the measuring scale means carried by each of the plurality of spacer members starts from a central point on each spacer member and extends oppositely therefrom whereby to denote at each measuring scale location on each side of said central point the included length therebewteen.

It is a further object to provide a form of the present invention adapted for home use and wherein the spacer members in any of various selected extended positions may be fastened by suitable fastening means to any underlying member, such as a table, board, floor, or the like.

It is a further object to provide a device of the character set forth in any of the preceding objects, which is of extremely simple, cheap, foolproof construction such as to be conducive to widespread use of the device.

Further objects will be apparent to persons skilled in the art after a careful study hereof.

For the purpose of clarifying the nature of the present invention, two exemplary embodiments are illustrated in the hereinbelow-described figures of the accompanying two sheets of drawings, and are described in detail hereinafter:

FIG. 1 is a fragmentary perspective view of one exemplary form of the invention.

FIG. 2 is a larger scale cross-sectional view taken in the direction of the arrows 2—2 of FIG. 1.

FIG. 3 is a perspective view of one of the grooved slide members normally fastened to the center of and projecting downwardly from each of the spacer members and adapted to slide along the edges defining the longitudinal slot means in the top of the longitudinal track member.

FIG. 4 is an enlarged longitudinal central sectional view taken in the direction of the arrows 4—4 of FIG. 1.

FIG. 5 is a front elevational view of one illustrative exemplary type of controllably operable fastening means for locking any of the spacer members in any selected extended relationship along the length of the track member.

FIG. 6 is a side elevational view of the fastening means shown in FIG. 5.

FIG. 7 is an enlarged fragmentary top plan view showing the controllably operable fastening means illustrated in FIGS. 5 and 6 in engaged and locking relationship in the longitudinal slot in a slightly modified form of the track member and abutting the end of one of the spacer members.

Figure 8:
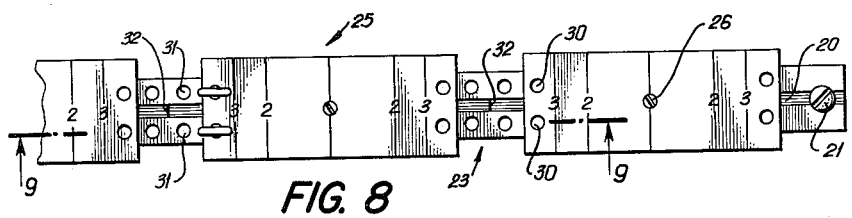
FIG. 8 is a top plan view of the form of the invention illustrated in FIG. 1, showing another form of controllably operable fastening means effectively locking one of the spacer members in a desired position with respect to the track member.
Figure 9:
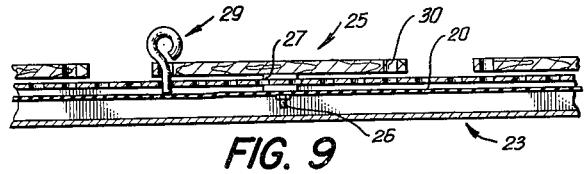
FIG. 9 is a longitudinal sectional view taken in the direction of the arrows 9—9 of FIG. 8.
Figure 10:
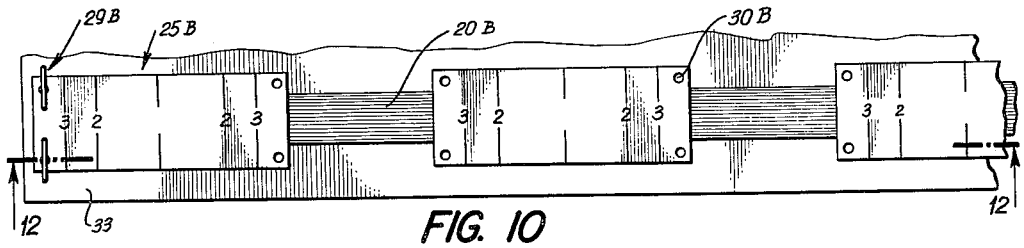
FIG. 10 is a fragmentary top plan view, somewhat like FIG. 8 but illustrating a slightly modified form of the invention.
Figure 13:
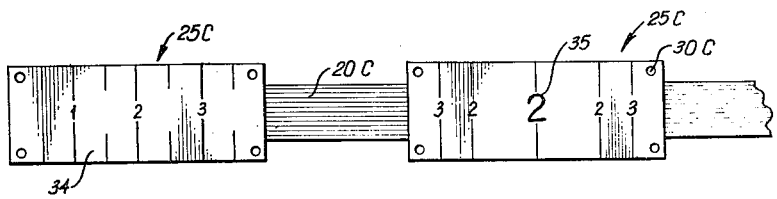

FIG. 13 is a view generally similar to FIG. 10 and shows a very slightly modified form of the invention wherein the first spacer carries linear measuring scale means starting at the left end and running to the right end, and wherein each of the remainder of the spacers, such as the second spacer illustrated, centrally carries a different number indicating the sequential position of the spacer along the length of the elastic longitudinal member.

In the specific embodiment of the invention illustrated in FIGS. 1–4, 8, and 9, the above-mentioned elastic longitudinal member takes one specific form and comprises an elastic tape, indicated at 20, having one end fastened by threaded fastening means 21 at a fixed location at one end 22 of a longitudinal track member, indicated genrally at 23, which is of channel-like cross-sectional configuration provided with a longitudinal top central slot 24 extending along the length thereof. In the specific example illustrated in FIGS. 1–4, 8, and 9, a plurality of spacer members, each of which is indicated generally at 25, have center portions fastened by suitable threaded fastening means 26 to downwardly projecting slide member means 27 which have laterally spaced parallel longitudinal grooves 28 at each edge thereof which slide on the edges of the track member 23 defining the longitudinal slot 24 along the length thereof. It should be noted that each of the threaded fastening means 26 is fastened at the botom thereof directly, or by suitable grommets, or the like, to the elastic longitudinal member 20 at equally spaced locations along the length thereof, whereby tension applied to the free end of the elastic longitudinal tape 20 at a location remote from the other fixed end thereof at 21 will cause the tape to elastically elongate and slidably move each of the spaced members 25 along the track member 23 by sliding engagement of each of the slide members 27 with respect to the longitudinal central slot 24 in a manner such that each of the spacers 25 will be symmetrically spaced along the length of the track member 23 and can then be fastened in said desired relationship by controllably operable fastening means, one specific form of which comprises a plurality of pins, such as are indicated generally at 29 in FIGS. 8 and 9 and which are adapted to be inserted downwardly through aperture means 30 in each of the spacer members 25 and through aligned aperture means 31 which are spacedly carried along the top of the track member 23 on each side of the longitudinal central slot 24. It will readily be understood that each of the spacer members 25 may be so fastened or locked in its normal symmetrically spaced relationship as determined by the extent to which the elastic member 20 has been stretched, or certain of the spacer members 25 may be slightly shifted from the normal position and locked in such slightly shifted position, if desired. It will be understood that this feature of the invention may be of importance when a panel of fabric material is resting on a table or other supporting surface immediately adjacent to the track member 23 and the plurality of spacer members 25 for the purpose of allowing the fabric panel to be appropriately marked by tailor's chalk, upholsterer's pins, or the like, to determine desired spacings between pleats which are proposed to be made in the fabric panel. This feature is important because seams in the fabric panel should never fall in a space aligned with any one of the spacer blocks in a region which will fall between pleats in the finally made drapery, because such seams would then be visible to an observer. Therefore, shifting of one or more of the spacer members 25 and locking them in such shifted positions can be so arranged that any seams in the fabric panel may be caused to fall in locations between the spacer members where pleats will later be made in the fabric panel and, thus, cause said seams to be completely hidden in the fully made draperies.

It should be noted that the spacing between adjacent proposed pleats in the fabric panels may be determined by the measuring scale means carried by the top of each of the spacer members 25 and which comprises in the example indicated the markings symmetrically spaced on each side of the center point 26 and indicating the included length therebetween. While the measuring scale means carried by the top of each of the spacer members 25 is shown in one specific form wherein included lengths symmetrically disposed on each side of the center point 26 are indicated for two inches and three inches, it should be clearly understood that the ends of each spacer member include therebetween four inches and that an appropriate numerical designation of 4 adjacent each end of the spacer member may be provided to make this clear. It is not shown in the drawings for reasons of drawing clarity and simplification. However, it should be clearly understood that the invention includes and comprehends such an arrangement of each of the measuring scale means and also includes and comprehends additional scale markings such as intervening half-inch markings between each of the different inch markings, which are not shown in the drawings for reasons of drawing clarity and simplification.

It should also be noted that the elastic member 20 may bear suitable markings, such as indicated at 32, at mid points between the adjacent ends of adjacent spacer members 25 for use when marking doubled-over fabric material.

FIGS. 5–7 illustrate a slight modification of the invention wherein the longitudinal track member 23A does not have a plurality of apertures along the top thereof such as shown at 31 in the first form of the invention, and also wherein the fastening means 29A does not comprise retaining pin means as in the first form of the invention, but takes the form of manually controllably lockable rotary cam means of generally elliptical shape and of resilient compressible material such that each of said fastening or locking cams 29A may be inserted into the longitudinal central slot 24A and then rotated into locking abutment with the sides of the top portion of the track member 23A defining the slot 24A, thus providing means for effectively locking each of the spacer members 25A in any desired position along the length of the track 23A.

Figure 11:
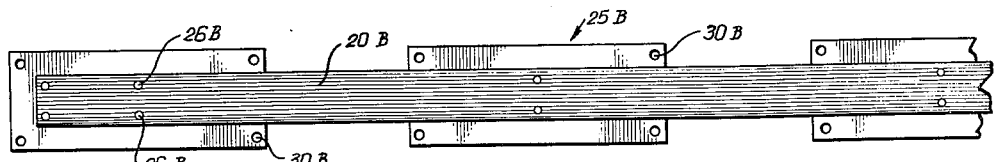
FIG. 11 is a bottom plan view of the form of the invention illustrated in FIG. 10.
Figure 12:
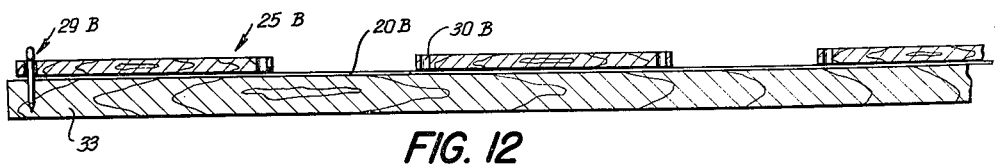
FIG. 12 is a longitudinal sectional view taken in the direction of the arrows 12—12 of FIG. 10.

FIGS. 10–12 illustrate another slightly modified form of the invention wherein there is no track member corresponding to the track member 23 shown in the first form of the invention, and wherein each of the spacer members 25B is centrally fastened as indicated at 26B directly to the elastic member 20B and not through an intermediary slide member as shown at 27 in the first form of the present invention.

In this modification, the fastening means 29B comprise upholsterer's pins adapted to be inserted through the apertures 30B directly into an underlying member 33, which may comprise a wooden table surface, a board, a floor, or any other suitable surface into which the upholsterers' pins 29B can be removably inserted so as to hold the spacer members 25B in desired positions.

It should be noted that in all thre species of the present invention illustrated, a preferred arrangement is to initially prestretch the elastic longitudinal member by having the lengths between centers of the spacer members greater than the normal free unstretched length of the elastic longitudinal member between the points of attachment to adjacent spacer members. This increases the accuracy and linearity of operation of the device.

It should also be noted that the form of the present invention using a track member is ideally adapted for fastening attachment to the edge of a very long drapery maker's work table so as to lie in substantially the same plane with the top surface thereof along one edge in a manner whereby lengths of fabric panel (made up of widths of fabric material sewn together) may be placed on the work table with an edge thereof immediately adjacent to the longitudinal track member for the drapery-pleat-spacing-and-marking operations described hereinbefore. It should also be noted that, if desired, one end of the longitudinal track member may form a large reverse loop and extend into a position underneath such a work table so as to provide a reservoir of a large number of the spacer members carried by an extended length of the elastic longitudinal member, making it possible for the device to be used with various size drapery panels of fabric material.

FIG. 13 illustrates another slightly modified form of the present invention very similar to the form illustrated in FIGS. 10-12 except that the first spacer member 25C bears a linear measuring scale indicated at 34 starting at the left end thereof and running toward the right end thereof, and also except that each of the rest of the spacer members, such as the second spacer member shown, centrally bears a positional or sequence identification number, such as shown at 35, indicating its sequential position along tht length of the elastic longitudinal member 20C.

The first spacer 25C does not bear a positional or sequence identification number and does carry the linear measuring scale 34 because the first spacer is used to measure that portion of drapery material which will overlap at the center of a pair of draperies where the two sides come together, or at the wall where the drapery returns to the wall. Therefore, the measuring scale markings 34 borne by the first spacer may be employed to enable the operator to get the desired width at the end of the drapery for the purposes just described without having to refer to another and separate ruler.

Each of the spacers other than the first spacer 25C carries a positional or sequence identification number 35 indicating its position along the elastic longitudinal member 20C, which makes it possible for an operator to quickly refer to a chart, which will customarily be supplied with the device of the present invention, which will indicate how many spacers should be used to end up with a specified drapery of a specified number of inches in overall width. For example, if the operator knew that the completed drapery was to be 54 inches wide, the chart would tell her how many spacers to use to end up with a drapery 54 inches wide. She would then locate the spacer 25C bearing the positional or sequence identification number 35 corresponding to the number of spacers required, as shown on the chart, and she would be relieved of the necessity of counting the number of spacers until she got the right number. This would very quickly enable her to use the apparatus so as to produce a drapery of the exact specified overall width of 54 inches. It should be understood that the dimensions just mentioned are for illustrative purposes only, and do not limit the invention in any respect whatsoever.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

We claim:

1. Apparatus for facilitating the making of pleated draperies, comprising: an elastic longitudinal member carrying at equally spaced locations therealong a plurality of spacer members; fastening means for fastening a first portion of said elastic longitudinal member at a fixed location; and controllably operable fastening means for locking said spacer members in any selected extended relationship with respect to said fixed location.

2. Apparatus of the character defined in claim 1, wherein said controllably operable fastening means comprises aperture means carried by said spacer member and insertion pins extendable therethrough into a fixed underlying member.

3. Apparatus of the character defined in claim 1, wherein each of said spacer members bears measuring scale means thereon starting from a central point on said spacer member and extending oppositely therefrom whereby to denote at each measuring scale location on each side of said central point the included length therebetween.

4. Apparatus of the character defined in claim 1, wherein said spacer members, when abutting one another in end-to-end relationship, are longer between their points of attachment along the length of said elastic longitudinal member than the corresponding intervening free unstretched lengths of said elastic longitudinal member, whereby to pre-stretch said elastic longitudinal member by a predetermined amount.

5. Apparatus for facilitating the making of pleated draperies, comprising: an elastic longitudinal member; a plurality of spacer members having center portions attached to said elastic longitudinal member at equally spaced locations along the length thereof; a longitudinal track member of channel-like cross-sectional configuration provided with a longitudinal top central slot extending along the length thereof, said track member carrying said longitudinal elastic member therein along the length thereof and slidably carrying the central connection portions of each of said spacer members in said longitudinal slot means, with each of said spacer members being positioned above said longitudinal track member; fastening means carried by said longitudinal track member adjacent one end for fastening a first portion of said elastic longitudinal member therein at a fixed location therealong; and controllably operable fastening means for locking said spacer members in any selected extended relationship along the length of said track member.

6. Apparatus of the character defined in claim 5, wherein said controllably operable fastening means comprises aperture means along the top of said track member on each side of said longitudinal slot and alignable aperture means carried by said spacer member and insertion pins extendable therethrough into the aligned apertures of said track member.

7. Apparatus of the character defined in claim 5, wherein said controllably operable fastening means comprises manually controllably lockable rotary cam means positionable in any selected location along said longitudinal slot between adjacent spacer members for positioning abutment therewith.

8. Apparatus of the character defined in claim 5, wherein each of said spacer members bears measuring scale means thereon starting from a central point on said whereby to denote at each measuring scale location on each side of said central point the included length therebetween.

9. Apparatus of the character defined in claim 5, wherein said spacer members, when abutting one another in end-to-end relationship, are longer between their points of atachment along the length of said elastic longitudinal member than the corresponding intervening free unstretched lengths of said elastic longitudinal member, whereby to pre-stretch said elastic longitudinal member by a predetermined amount.

10. Apparatus of the character defined in claim 6, wherein each of said center portions of said spacer member is provided with downwardly projecting slide member means with laterally spaced parallel longitudinal grooves at each edge thereof and with the bottom of said slide member being connected to said elastic longitudinal member at equally spaced locations along the length thereof, and wherein said track member slidably carries the central downwardly projecting slide members of each of said spacer members with the laterally spaced longitudinal grooves thereof engaging corresponding edge portions of said track member defining said longitudinal slot.

References Cited in the file of this patent

UNITED STATES PATENTS

| | | |
|---|---|---|
| 120,621 | Chassaing | Nov. 7, 1871 |
| 338,527 | Hyde | Mar. 23, 1886 |
| 2,190,472 | Ferrughelli | Feb. 13, 1940 |
| 2,256,116 | Hughes | Sept. 16, 1941 |
| 2,331,298 | Bennett | Oct. 12, 1943 |
| 2,422,745 | Ost | June 24, 1947 |
| 2,561,020 | Gerber | July 17, 1951 |